United States Patent Office 2,762,753
Patented Sept. 11, 1956

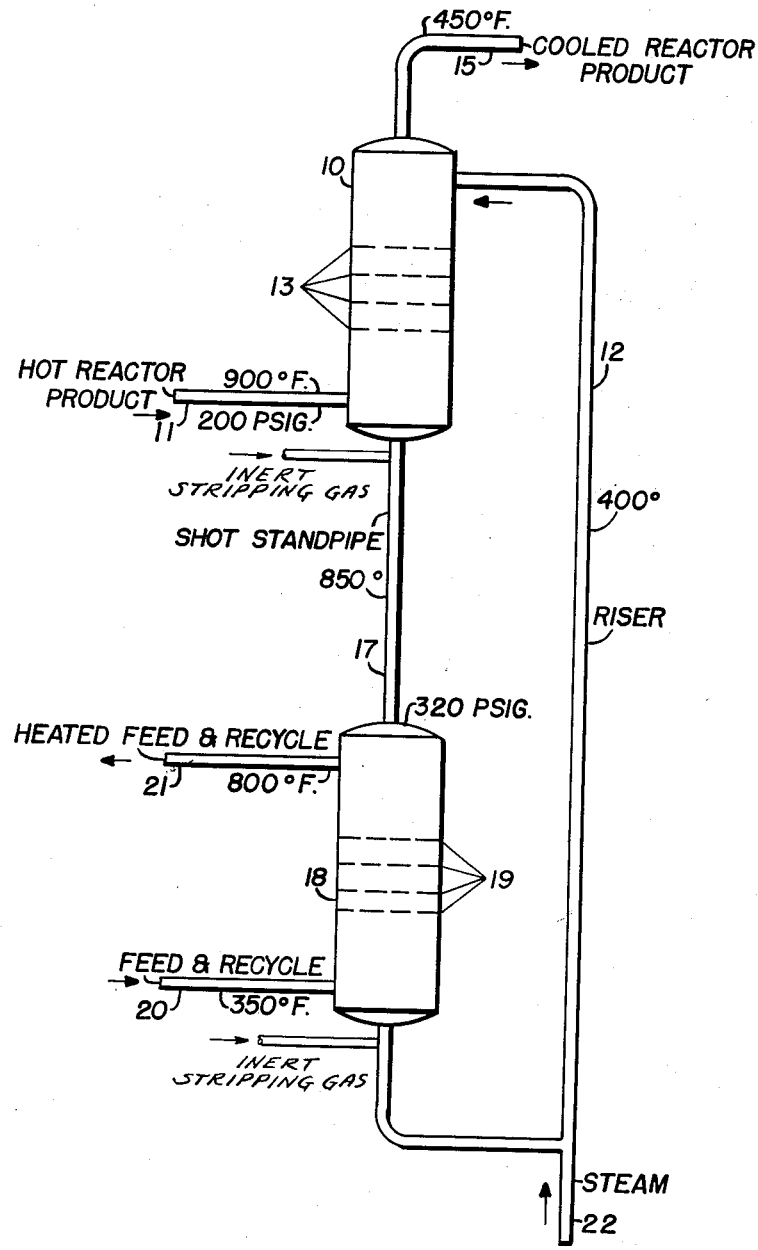

2,762,753

HEAT EXCHANGE SYSTEM

Wilson C. Rich, Jr., Mountainside, and Charles E. Jahnig, Red Bank, N. J., assignors to Esso Research and Engineering Company, a corporation of Delaware Application December 26, 1952, Serial No. 327,979

10 Claims. (Cl. 196—50)

This invention pertains to a heat recovery system and particularly to a heat recovery system that is especially adapted for use in a hydroforming reaction system.

Hydroforming is a well known process for treating hydrocarbon fractions boiling within the motor fuel or naphtha range to upgrade the same or increase the aromaticity and improve the anti-knock characteristics of said hydrocarbon fractions. By hydroforming is meant an operation conducted at elevated temperatures and pressures in the presence of solid catalyst particles and hydrogen whereby the hydrocarbon fraction is increased in aromaticity and in which operation there is no net consumption of hydrogen. Hydroforming is ordinarily carried out in the presence of hydrogen or hydrogen-rich recycle gas at temperatures of about 850–950° F. and at pressures of about 50–1000 lbs. per. sq. inch and in contact with such catalysts as platinum, molybdenum oxide, chromium oxide or, in general, oxides or sulfides of metals of groups IV, V, VI, VII and VIII of the periodic system of elements, alone, or generally supported on a base or spacing agent such as alumina gel, precipitated alumina or zinc aluminate spinel.

In hydroforming, the dehydrogenation of naphthenes and, to a smaller degree, the cracking and cyclization of paraffins are highly endothermic reactions. Hydrogenation of the olefins present or formed is an exothermic reaction and offsets the heat requirements of the first-named reactions to a minor extent. The heat of reaction depends somewhat upon the amount of hydrogen formed in the reaction and increases, for example, from about 100 B. t. u. per lb. of feed when producing about 200–250 cu. ft. of hydrogen per barrel of feed to about 250 B. t. u. per lb. of feed when producing about 800 cu. ft. of hydrogen per barrel of feed.

The heat of reaction required in hydroforming is supplied by preheating the feed stock to or above reaction temperature, by preheating the hydrogen-rich recycle gas circulated through the reaction zone to temperatures two to three hundred degrees above reaction temperature, and, in the case of fluidized solids operations, by recycling regenerated catalyst at or near regeneration temperature to the reaction zone. Of these methods, preheating of recycle gas is generally used to supply a major proportion of the heat of reaction. However, in order to prepare recycle gas which is suitable for preheating to temperatures of 1200–1250° F., it is necessary to cool the reaction products and the accompanying diluent or make-gas to temperatures of about 80–120° F. in order to substantially reduce the concentration of C4 and higher hydrocarbons. In order to utilize some of the sensible heat in the reaction products stream, it has been proposed to pass the reaction products in indirect heat exchange relation to the naphtha feed and/or the recycle gas. However, recovery of heat in this manner requires extensive heat transfer surface since heat transfer coefficients are low and close approaches are required.

It is the object of this invention to provide an improved method for recovering heat from a hydrocarbon reaction products stream.

It is also the object of this invention to provide a heat recovery system which is particularly adapted for use in hydroforming reaction systems.

It is a further objects of this invention to provide an improved method for recovering heat from a hydroforming reaction products stream and transferring the same to a feed naphtha or other stream entering the reaction zone.

These and other objects will appear more clearly from the detailed specification and claims which follow.

It has now been found that maximum heat recovery from the reactor product overhead stream may be achieved by directly contacting the said stream with a mass of heat exchanger solids, preferably maintained as a dense, fluidized liquid-simulating bed or mass. The heat exchanger solids are used first to cool the reaction products substantially to their dew point or a somewhat higher temperature, whereupon the solids are contacted with the naphtha feed stream to heat it substantially to reaction temperature. Heat exchange in each case is preferably carried out in stages and with countercurrent flow of heat exchanger solids and reaction product and feed naphtha streams. Normally, contacting plates will be needed to increase the shot holdup in the tower, and provide the time required to effect the desired heat transfer between the shot and vapors. Without these, heat transfer might be inadequate. Clay, mullite, sand, metal shot or other inert material can be used as the heat exchanger solids.

The size of the heat transfer solid or shot used in this system will generally be over 100 microns diameter. Particles as large as say 1/8″ diameter can be handled satisfactorily. With metal shot the size will normally be in the range of 100 to 2000 microns. With materials of lower density the size may be somewhat larger. A closely sized fraction may be used, or the material may consist of coarse particles having a range of diameters. In a preferred embodiment the heat transfer solids have a density of less than 5 grams per cc. and a diameter of from 200 to 2000 microns.

With these coarse solids the entrainment or carryover from a fluidized bed increases very sharply when the free fall velocity of the particles is exceeded. This is not the case when dealing with finer solids containing appreciable amounts of material smaller than 40 microns in diameter. Hence, the vessel velocities in the heat exchange towers should be above the minimum fluidizing velocity but below the free fall velocity. The following table gives these velocities for various specific cases as calculated in a manner well known in the art.

| Particle Diameter, Microns | 50 | 100 | 500 |
|---|---|---|---|
| Glass beads in Air @ 1 atm., 60° F.: | | | |
| Min. fluidiz. velocity, F./S | .0062 | .025 | .54 |
| Free fall velocity, F./S | .54 | 1.70 | 13.0 |
| Glass beads in Air @ 500 p. s. i. g., 60° F.: | | | |
| Min. fluidiz. velocity, F./S | .0062 | .025 | .21 |
| Free fall velocity, F./S | .35 | .80 | 3.10 |
| Iron Shot in Air @ 1 atm., 60° F.: | | | |
| Min. fluidiz. velocity, F./S | .021 | .08 | 1.36 |
| Free fall velocity, F./S | 1.6 | 4.7 | 24.3 |
| h [1] B. t. u./hr. sq. ft., °F | 245 | 122 | 25 |
| Sq. Ft./C. F. @ 50% Voids | 18,400 | 9,170 | 1,840 |
| B. t. u./Hr./Cu. ft. of bed, for 10° F. temp. difference at 50% voids, mm | 45 | 11.2 | .46 |

[1] Heat transfer coefficient for gas conductivity of .02 B. t. u./hr., sq. ft., °F./ft.

The upper half of the table shows minimum fluidizing and free fall velocities for typical cases. It will normally be desirable to select a particle size and density such that the velocity can be high enough to allow using relatively small diameter vessels. Thus, the free fall velocity may be in the range of 5 to 25 ft./second. Actual gas velocity in the tower may be one-half of the free fall velocity, in order to be safely below the point of high entrainment. The lower half of the preceding table gives typical design information needed for calculating the heat transfer in the beds. Heat transfer coefficient by conduction is proportional to the conductivity of the gas, and inversely proportional to the particle diameter. The surface area of the particles per cu. ft. of bed is highest for smaller diameters. From these heat transfer rates the minimum height of bed necessary on each plant can be calculated. Following these examples, similar figures can be derived for any other sets of conditions. As indicated, the amount of heat transferred is proportional to the temperature difference between the vapors and the solid particles and this can be set at a suitable value.

Circulation of the shot from one vessel to another may be carried out in several ways. In some designs a simple standpipe will feed the shot from one vessel to another. In order to provide circulation, at least one riser is necessary to raise the shot back to the higher elevation. This may be a conventional diluent phase riser in which the shot is carried up by a relatively high velocity gas stream. For example, the velocity may be above the free fall velocity of the shot. Alternatively, a dense phase U bend can be used. In this, one side operates as a standpipe, and the density on the upflow side is reduced somewhat by controlling the amount of aeration gas introduced into the upflow side. The difference in density on the two sides causes the solids to flow toward the zone of lower density. This U bend system may be used for controlling solids flow rate, or a slide valve can be used.

In many applications it will be desirable to operate one of the heat exchange towers at substantially higher pressure than the other. For example, it is generally necessary to have the feed and recycle gas at a pressure higher than the reactor outlet pressure, in order to allow for pressure drop through preheat furnaces or through the hydroforming reactor. For this purpose a standpipe can be used to feed the shot from the upper product cooler tower to a lower feed preheat tower. The latter may be at 10 to 100 p. s. i. higher pressure. This is an important feature of the shot system in many applications.

Several sets of contact towers may be used in parallel or series. These may be combined in many different ways. For example, the hot product vapors may flow in parallel through two contact towers each of which supplies heated shot to a separate preheat stream contact tower. The latter may be used to preheat separate streams of feed and recycle gas. Alternatively, the hot reactor products may flow through two or more towers in series. Heated shot flow may be divided and part fed to one preheat tower while the remainder is fed to a separate tower. The shot streams from the latter towers may be combined and returned to the shot heater, or they may be returned as separate streams, and if one is at higher temperature it can be introduced to the shot heater at an intermediate elevation.

Shot flowing between contact towers may be stripped to prevent transfer of feed or products along with the shot. It may also be desirable to strip to prevent fine catalyst dust from being carried along with the shot, although normally the major part of any dust in the hot reactor products will blow through the contact towers.

Reference is made to the accompanying drawing illustrating a diagrammatic flow plan of one embodiment of the present invention.

In the drawing, 10 is a reactor product cooler and 11 is a conduit through which reactor product overhead is supplied at substantially reactor temperature of about 900° F. and at system pressure. Relatively cool or cold heat exchanger solids such as sand, clay, metal shot or the like are supplied to reactor product cooler tower 10 through line 12. The reactor product cooler 10 is preferably provided with a plurality of baffles, or perforated or slotted plates or trays 13 in order that cooling may be effected in stages. Accordingly, the line 12 is connected to cooler 10 in such a way as to discharge the cool heat exchanger solids above the uppermost perforated plate 13 and the hot reactor product overhead line 11 is connected to cooler 10 to discharge the hot product vapors below the lowermost perforated plate or tray 13. The perforated plate or trays may be designed to permit the passage of solids downward through the openings countercurrent to the upflowing reactor product vapors, or a separate downcomer may be provided for the transfer of solids from one plate to the next lower plate. If downcomers are provided, they may further be equipped with a wier or the like in order to maintain a definite minimum level of heat exchanger solids on each of the perforated plates. The superficial velocity of the upflowing vapors on cooler 10 is controlled to maintain the heat exchanger solids as a dense fluidized mass within the cooler 10. The cooled reactor products are taken overhead from cooler 10 through outlet line 15 to suitable product recovery, finishing and storage facilities.

The hot, heat exchanger solids pass from the bottom of cooler 10 into a standpipe 17 where sufficient fluistatic pressure is built up to facilitate the transfer of solids through the feed or recycle gas heating section 18 of the system. Taps for the introduction of fluidizing gas and a slide valve or the like for controlling the flow of solids may be arranged in the standpipe 17.

The heat transfer solids are discharged from the base of standpipe 17 into the feed and recycle heater 18 which is also equipped with a plurality of perforated plates 19. Cold feed and/or recycle gas is supplied through inlet line 20 to heater 18 below the bottommost perforated plate 19.

The heater 18 provided with a plurality of perforated plates or trays 19, is supplied with the heat transfer solids above the uppermost plate in order to insure countercurrent contact of the heat transfer solids and feed and/or recycle gas. By effecting heat exchange countercurrently, the heat transfer solids accumulating at the bottom of heat exchanger 18 will be at a satisfactorily low temperature for transfer through line 12 into reactor product cooler 10 and the feed naphtha and/or recycle gas can be removed overhead from heat exchanger 18 through outlet line 21 at a maximum temperature. Vapors leaving the towers at 21 (or 15) may be passed through cyclone separators to remove any shot that is carried out. The feed and/or recycle gas may be passed directly to the reaction zone or preferably is passed to a suitable furnace for further heating before discharge into the reaction zone. The cooled heat transfer solids leaving heater 18 are lifted back to the overhead cooler 10 in a dense phase riser 12 in which steam is injected at line 22 to reduce riser density sufficiently for solids flow.

Numerous modifications may be made in the foregoing system and it will be understood that control valves and other conventional equipment may be provided in the system shown. The position of the reactor products cooler and the feed and/or recycle gas heater may be reversed, if desired, and the dense phase U-bend riser combination may be substituted for the standpipe-dilute phase-riser combination. Moreover, the entire combination may be repeated one or more additional times in order to provide several cooling and heating stages. For example, cooling of reaction products may be limited in the first stage as by cooling from about 900 to about 700° F. in a first stage whereupon the product gases are passed to a second or duplicate system where they are cooled to about 450° F., the heated solids in the second or duplicate system being used to heat a feed stream such as recycle gas to an intermediate temperature, for example about 650–675° F. The hot heat exchange solids passing through standpipe 17 may also be divided into two or more streams of the same or different sizes which are fed to separate heater vessels for heating different feed streams to the reactor.

The operation of the heat exchange system of the present invention is as follows: a hydrocarbon fraction such as a 200–330° F. boiling range virgin naphtha is hydroformed at a temperature of about 900–925° F. and at a pressure of about 200 lbs. per sq. inch in contact with a catalyst comprising about 10 wt. percent molybdenum oxide on activated alumina or alumina gel. Hydrogen-rich recycle gas is passed through the reaction zone at a rate of from about 2500–10,000 cu. ft. per barrel of feed. The reaction zone may be operated fixed bed, moving bed or preferably as a fluidized bed with continuous circulation of catalyst from the reactor to the regenerator where inactivating carbonaceous deposits are burned off and from the regenerator back to the reactor either directly or after suitable pretreatment with hydrogen or hydrogen-rich recycle gas.

Reaction products are taken overhead from the reaction zone at about 900° F. and passed into reactor product cooler 10. Heat exchanger solids such as sand, metal shot or the like is supplied to the reactor products cooler at a temperature of about 400° F. and in sufficient amount to cool the reaction products to about 450° F. or just above its dew point or to some suitably higher temperature. By cooling the product vapors to substantially its dew point in product cooler 10, it is possible to obviate the necessity of providing cooling or quench means in the separator drum usually provided in the product recovery system for removing dust, and polymers or other higher boiling products.

The heat transfer solids, at temperatures approaching the temperature of the incoming reactor product overhead, i. e. at temperatures of about 800–850° F. pass from the bottom of reactor product cooler 10 into standpipe 17 where a fluistatic pressure is built up sufficient to facilitate the transfer of the solids to the feed and/or recycle gas heater 18. The hot heat transfer solids are discharged from the base of the standpipe 17 into the heater 18. The feed and/or recycle gas passes countercurrent to the heat transfer solids in heater 18 and the feed and/or recycle gas heated to temperatures of about 700–800° F. are taken overhead and passed to the reactor or to suitable additional preheating means. The heat transfer solids cooled to about 400° F. pass from the bottom of heater 18 into a U-bend dense phase riser 12 where they are lifted by steam into the reactor product cooler for recycling in the heat exchange system.

In the shot heater used for preheating feed, the naphtha may be fed as a liquid. The shot is sufficiently hot to vaporize the naphtha and preheat the vapor. Preferably the naphtha is sprayed in, to avoid excessive local cooling and wetting of the shot. Temperature of the shot leaving the contactor is substantially above the dew point in the contactor, so that no liquid feed is carried out with the shot.

The shot heat transfer system is useful in other processes such as cracking or dehydrogenation of light hydrocarbons to make olefins or chemicals. For example, butane can be dehydrogenated in a fixed or fluid bed process as is well known. Exchangers for cooling the products and preheating the feed are expensive due to the severe service and corrosive conditions. In this case a ceramic shot can be used, in vessels constructed of carbon steel lined with protective insulation. Product gas from the dehydrogenation reactor may be at 1200–1300° F. and somewhat above atmospheric pressure. This gas is contacted countercurrently with shot, for cooling to a temperature which may be as low as, for example 200–400° F. The shot is heated to 800–1200° F., and passes to another contact tower where it is used to preheat butane feed to 700–1100° F. A portion of the heated shot is used to preheat reaction steam in a separate contactor. The steam may be preheated to a temperature somewhat higher than the hydrocarbon feed. If preferred, the steam and hydrocarbon can both be preheated in the same shot contactor. Details of the operation and circulation are esesntially the same as described in connection with hydroforming.

The shot heat exchange system is particularly attractive for use in high temperature processes such as coal gasification. Reaction temperatures may be about 1700–2000° F., and designs using conventional tubular heat exchangers for cooling the products present very difficult mechanical problems due to thermal stresses. Moreover, the exchanger tubes operate at very high temperature in a reducing atmosphere containing sulfur, and corrosion is a major problem, even when using the most resistant alloys presently available.

With a shot system the particles may be of siliceous composition, and the equipment can be lined with a protective ceramic insulation. Thus, the shot exchanger results in large savings in investment and maintenance. In addition, it permits operation at higher temperatures than are practical with conventional metal tubular exchangers.

In gasification, preheated steam is reacted with coal or char, etc., preferably in a fluid type process. Heat for the process may be supplied by adding oxygen to the reactor, or by circulating char to a burner vessel, or by other means. The product gas contains carbon monoxide, hydrogen, steam, carbon dioxide, hydrogen sulfide, and other sulfur compounds. This gas at high temperature is contacted countercurrently with shot. The preheated shot is fed to a steam preheat contactor, which operates at higher pressure. Cooled shot is returned to the product gas contactor and the arrangements and operation are similar to those described for hydroforming.

In many cases process heat is supplied by circulating char to a burner vessel, which may be of the fluid type. In such case a separate stream of the aforementioned preheat shot may be used to preheat the air for combustion. This can be used to improve the system heat balance. Also, a separate shot system can be used for cooling the flue gases leaving the burner, and this heat can be transferred to the incoming air, etc. Since the flue gas is at higher than reactor temperature, the shot stream heated by the flue gas can be used to preheat reaction steam to a higher temperature than when using shot which has been preheated by contact with product gas. In each particular design, the shot system will be modified to provide the greatest advantage from the standpoint of heat balance, economy, etc.

The foregoing descriptions contain a limited number of embodiments of the present invention. It will be understood, however, that numerous variations are possible without departing from the scope of this invention.

What is claimed is:

1. A method of recovering the sensible heat from a reactor product overhead stream from a fluidized solids reactor which comprises passing the reactor products containing small amounts of entrained finely divided solids countercurrently to a fluidized mass of heat transfer solids in several stages in a reactor products cooler, separating cooled reactor product overhead from the heat transfer solids at temperatures substantially at the dew point of the reactor products thereby depositing entrained solids and the highest boiling constituents of said reactor products on said heat transfer solids, withdrawing heat transfer solids from the last of said stages at temperatures approaching the fresh reactor product overhead temperature, conveying the withdrawn heat transfer solids to a fresh feed heater, passing fresh feed countercurrently to a fluidized mass of heat transfer solids in several stages, removing heated fresh feed overhead from the heater, withdrawing cooled inert heat transfer solids from the last stage in said heater, and recycling the cooled heat transfer solids to the reactor products cooler.

2. The process as defined in claim 1 in which the heat transfer solids are metal particles having diameters of from 100-1000 microns.

3. The process as defined in claim 1 in which the heat transfer solids are metal particles having diameters of from 100-1000 microns and the gas velocity in each of the contacting zones is from 15 to 75% of the free fall velocity of the heat transfer solids.

4. The process as defined in claim 1 in which the heat transfer solids have a density of less than 5 grams per cc. and diameters of from 200 to 2000 microns.

5. The process as defined in claim 1 in which the heat transfer solids have a density of less than 5 grams per cc. and diameters of from 200 to 2000 microns and the gas velocity in each of the contacting zones is from 15 to 75% of the free fall velocity of the heat transfer solids.

6. The method according to claim 1 in which the reactor product overhead stream is from the dehydrogenation of light hydrocarbons and the hot heat transfer solids are used to preheat light hydrocarbon feed to the main dehydrogenation zone.

7. The method according to claim 1 in which the reactor product overhead stream is from the dehydrogenation of light hydrocarbons and the hot heat transfer solids are used to preheat steam feed to the main dehydrogenation zone.

8. The method according to claim 1 in which the reactor products stream is from the gasification of solid carbonaceous material and the hot heat transfer solids are used to preheat steam feed to the gasification zone.

9. The method according to claim 1 in which the reactor products stream is from the gasification of solid carbonaceous material and the hot heat transfer solids are used to preheat air and using the preheated air for the partial combustion of carbonaceous materials supplied to the gasification zone.

10. A method of recovering the sensible heat from a hydroforming reactor product overhead stream from a reactor containing a dense, fluidized bed of finely divided hydroforming catalyst which comprises passing the reactor products containing small amounts of entrained catalyst fines countercurrently to a fluidized mass of heat transfer solids in several stages in a reactor products cooler maintained at substantially the same pressure as that of the hydroforming reaction zone, separating cooled reactor product overhead from the heat transfer solids at temperatures substantially at the dew point of the reactor products thereby depositing entrained catalyst fines and the highest boiling constituents of said reactor products on said heat transfer solids, withdrawing heat transfer solids from the last of said stages at temperatures approaching the fresh reactor product overhead temperature, contacting the withdrawn solids with an inert stripping gas to remove entrained reaction products from the solids, conveying the stripped heat transfer solids to a fresh feed heater, maintaining a pressure in said heater more than about 10 lbs. per sq. inch above the pressure in the reactor products cooler, passing fresh feed countercurrently to a fluidized mass of heat transfer solids in several stages, removing heated fresh feed overhead from the heater, withdrawing cooled inert heat transfer solids from the last stage in said heater, contacting the withdrawn solids with an inert stripping gas to remove entrained fresh feed from the solids and recycling the stripped, cooled heat transfer solids to the reactor products cooler.

References Cited in the file of this patent

UNITED STATES PATENTS

| 2,443,210 | Upham | June 15, 1948 |
| 2,600,078 | Schutte et al. | June 10, 1952 |
| 2,601,102 | Dickey | June 17, 1952 |

FOREIGN PATENTS

| 638,511 | Great Britain | June 7, 1950 |